US011513201B2

(12) United States Patent
John et al.

(10) Patent No.: US 11,513,201 B2
(45) Date of Patent: Nov. 29, 2022

(54) TECHNIQUES FOR GHOSTING MITIGATION IN COHERENT LIDAR SYSTEMS USING IN-PHASE/QUADRATURE PHASE (IQ) PROCESSING

(71) Applicant: AEVA, INC., Mountain View, CA (US)

(72) Inventors: Esha John, Sunnyvale, CA (US); Jose Krause Perin, Mountain View, CA (US); Kumar Bhargav Viswanatha, Santa Clara, CA (US); Rajendra Tushar Moorti, Mountain View, CA (US); James Nakamura, Chicago, IL (US); Carlo Giustini, Mountain View, CA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 17/702,595

(22) Filed: Mar. 23, 2022

(65) Prior Publication Data
US 2022/0308192 A1  Sep. 29, 2022

Related U.S. Application Data

(60) Provisional application No. 63/165,601, filed on Mar. 24, 2021.

(51) Int. Cl.
*G01S 7/4912* (2020.01)
*G01S 7/481* (2006.01)
*G01S 17/931* (2020.01)

(52) U.S. Cl.
CPC .......... *G01S 7/4912* (2013.01); *G01S 7/4817* (2013.01); *G01S 17/931* (2020.01)

(58) Field of Classification Search
CPC ..... G01S 7/4912; G01S 7/4817; G01S 17/931
USPC ....................................................... 356/5.09
See application file for complete search history.

(56) References Cited

U.S. PATENT DOCUMENTS 10,401,495 B2 * 9/2019 Crouch ................... G01S 17/26

* cited by examiner

*Primary Examiner* — Daniel L Murphy
(74) *Attorney, Agent, or Firm* — Womble Bond Dickinson (US) LLP

(57) ABSTRACT

A light detection and ranging (LIDAR) system to transmit optical beams including at least up-chirp frequency and at least one down-chirp frequency toward targets in a field of view of the LIDAR system and receive returned signals of the up-chirp and the down-chirp as reflected from the targets. The LIDAR system may perform IQ processing on one or more returned signals to generate baseband signals in the frequency domain of the returned signals during the at least one up-chirp and the at least one down-chirp. The baseband signal includes a first set of peaks associated with the at least one up-chirp frequency and a second set of peaks associated with the at least one down-chirp frequency. The LIDAR system determines the target location using the first set of peaks and the second set of peaks.

20 Claims, 10 Drawing Sheets

TECHNIQUES FOR GHOSTING MITIGATION IN COHERENT LIDAR SYSTEMS USING IN-PHASE/QUADRATURE PHASE (IQ) PROCESSING

RELATED APPLICATIONS

This application claims priority from and the benefit of U.S. Provisional Patent Application No. 63/165,601 filed on Mar. 24, 2021, the entire contents of which are incorporated herein by reference in their entirety.

FIELD

The present disclosure is related to LIDAR (light detection and ranging) systems in general, and more particularly to ghosting mitigation in coherent LIDAR systems.

BACKGROUND

LIDAR systems, such as frequency-modulated continuous-wave (FMCW) LIDAR systems, use tunable, infrared lasers for frequency-chirped illumination of targets, and coherent receivers for detection of backscattered or reflected light from the targets that are combined with a local copy of the transmitted signal. Mixing the local copy with the return signal (e.g., a returned signal), delayed by the round-trip time to the target and back, generates signals at the receiver with frequencies that are proportional to the distance to each target in the field of view of the system. An up sweep of frequency and a down sweep of frequency may be used to detect a range and velocity of a detected target. However, when one or more of the LIDAR system and a target (or multiple targets) are moving, the issue of associating the peaks corresponding to each target arises.

SUMMARY

The present disclosure describes examples of systems and methods for ghosting mitigation in coherent LIDAR systems.

According to one aspect, the present disclosure relates to a method. The method includes transmitting, toward a target in a field of view of a light detection and ranging (LIDAR) system, one or more optical beams including at least one up-chirp frequency and at least one down-chirp frequency. The method also includes receiving, from the target, a set of returned signals based on the one or more optical beams. The method further includes determining whether peaks associated with the target are within one or more sets of frequency ranges including signal attribute values corresponding to a lower likelihood of accurately calculating a location or speed of the target. The method further includes, provided the peaks associated with the target are within the one or more sets of frequency ranges, performing in-phase quadrature phase (IQ) processing on the one or more received signals. The set of returned signals includes a Doppler shifted up-chirp frequency shifted from the at least one up-chirp frequency caused by a relative motion between the target and the LIDAR system, and a Doppler shifted down-chirp frequency shifted from the at least one down-chirp frequency caused by the relative motion between the target and the LIDAR system. The Doppler shifted up-chirp frequency and the Doppler shifted down-chirp frequency produce a first set of peaks associated with the at least one up-chirp frequency corresponding to a target location of the target and a second set of peaks associated with the at least one down-chirp frequency corresponding to the target location. The method further includes, determining one or more of the target location, a target velocity, and a target reflectivity using the first set of peaks and the second set of peaks.

In one embodiment, the first set of peaks includes a first true peak and a first image peak, the second set of peaks includes a second true peak and a second image peak, the IQ processing reduces a first magnitude of the first image peak and a second magnitude of the second image peak.

In one embodiment, determining the target location using the first set of peaks and the second set of peaks includes selecting the first true peak from the first set of peaks and the second true peak from the second set of peaks and determining the target location based on the first true peak and the second true peak.

In one embodiment, the one or more sets of frequency ranges are based on an ego-velocity of the LIDAR system.

In one embodiment, performing IQ processing includes generating a first signal and second signal based on the set of returned signals, wherein the first signal is shifted 90 degrees from the second signal, generating a third signal, wherein the third signal includes a combination of the first signal and an imaginary unit, and combining the third and the second signal to generate a combined signal.

In one embodiment, performing IQ processing further includes applying a fast Fourier transformer to the combined signal.

In one embodiment, combining the third and the second signal includes subtracting the third signal from the second signal for an up-chirp and adding the third signal to the second signal for a down-chirp, or adding the third signal to the second signal for an up-chirp and subtracting the third signal from the second signal for a down-chirp.

In one embodiment, subtracting the third signal from the second signal for an up-chirp and adding the third signal to the second signal for a down-chirp reduces a range of frequencies that is processed to determine one or more of the target location, the target velocity, and the target reflectivity.

In one embodiment, the method further includes, provided the peaks associated with the target are not within the one or more sets of frequency ranges, refraining from using in-phase quadrature phase (IQ) circuitry.

According to one aspect, the present disclosure relates to a light detection and ranging (LIDAR) system. The LIDAR system includes an optical scanner to transmit one or more optical beams including at least one up-chirp frequency and at least one down-chirp frequency toward a target in a field of view of the LIDAR system and receive a set of returned signals based on the one or more optical beams. The LIDAR system also includes an optical processing system coupled to the optical scanner to generate a baseband signal in a time domain from the return signal, the baseband signal including frequencies corresponding to LIDAR target ranges. The LIDAR system further includes a signal processing system coupled to the optical processing system. The signal processing system includes a processing device and a memory to store instructions that, when executed by the processing device, cause the LIDAR system to determine whether peaks associated with the target are within one or more sets of frequency ranges including signal attribute values corresponding to a lower likelihood of accurately calculating a location or speed of the target, provided the peaks associated with the target are within the one or more sets of frequency ranges, perform in-phase quadrature phase (IQ) processing on the one or more received signals wherein, the set of returned signals includes a Doppler shifted up-chirp frequency shifted from the at least one up-chirp frequency caused by a relative motion between the target and the LIDAR system, and a Doppler shifted down-chirp frequency shifted from the at least one down-chirp frequency caused by the relative motion between the target and the LIDAR system, and the Doppler shifted up-chirp frequency and the Doppler shifted down-chirp frequency produce a first set of peaks associated with the at least one up-chirp frequency corresponding to a target location of the target and a second set of peaks associated with the at least one down-chirp frequency corresponding to the target location, and determine one or more of the target location, a target velocity, and a target reflectivity using the first set of peaks and the second set of peaks.

In one embodiment, the first set of peaks includes a first true peak and a first image peak, the second set of peaks includes a second true peak and a second image peak, and the IQ processing reduces a first magnitude of the first image peak and a second magnitude of the second image peak.

In one embodiment, to determine the target location using the first set of peaks and the second set of peaks the LIDAR system is further to select the first true peak from the first set of peaks and the second true peak from the second set of peaks, and determine the target location based on the first true peak and the second true peak.

In one embodiment, the one or more sets of frequency ranges are variable based on an ego-velocity of the LIDAR system.

In one embodiment, to perform IQ processing the LIDAR system is further to: generate a first signal and a second signal based on the set of returned signals, wherein the first signal is shifted 90 degrees from the second signal, generate a third signal, wherein the third signal includes a combination of the first signal and an imaginary unit, and combine the third and the second signal to generate a combined signal.

In one embodiment, to perform IQ processing the LIDAR system is further to apply a fast Fourier transformer to the combined signal.

In one embodiment, to combine the third signal and the second signal the LIDAR system is further to subtract the third signal from the second signal for an up-chirp and add the j third signal to the second signal for a down-chirp, or add the third signal to the second signal for an up-chirp and subtract the third signal from the second signal for a down-chirp.

In one embodiment, subtracting the third signal from the second signal for an up-chirp and adding the third signal to the second signal for a down-chirp reduces a range of frequencies that is processed to determine one or more of the target location, the target velocity, and the target reflectivity.

In one embodiment, the LIDAR system is further to, provided the peaks associated with the target are not within the one or more sets of frequency ranges, refrain from using in-phase quadrature phase (IQ) circuitry.

According to one aspect, the present disclosure relates to a light detection and ranging (LIDAR) system. The LIDAR system includes a processor, and a memory to store instructions that, when executed by the processor, cause the LIDAR system to: transmit, toward a target in a field of view of the LIDAR system, one or more optical beams including at least one up-chirp frequency and at least one down-chirp frequency; receive, from the target, a set of returned signals based on the one or more optical beams; determine whether peaks associated with the target are within one or more sets of frequency ranges including signal attribute values corresponding to a lower likelihood of accurately calculating a location or speed of the target; provided the peaks associated with the target are within the one or more sets of frequency ranges, perform in-phase quadrature phase (IQ) processing on the one or more received signals wherein, the set of returned signals includes a Doppler shifted up-chirp frequency shifted from the at least one up-chirp frequency caused by a relative motion between the target and the LIDAR system, and a Doppler shifted down-chirp frequency shifted from the at least one down-chirp frequency caused by the relative motion between the target and the LIDAR system, and the Doppler shifted up-chirp frequency and the Doppler shifted down-chirp frequency produce a first set of peaks associated with the at least one up-chirp frequency corresponding to a target location of the target and a second set of peaks associated with the at least one down-chirp frequency corresponding to the target location, and determine one or more of the target location, a target velocity, and a target reflectivity using the first set of peaks and the second set of peaks.

In one embodiment, the first set of peaks includes a first true peak and a first image peak, the second set of peaks includes a second true peak and a second image peak, and the IQ processing reduces a first magnitude of the first image peak and a second magnitude of the second image peak.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

The present disclosure describes various examples of LIDAR systems and methods for automatically mitigating ghosting that may occur due to Doppler shifts. According to some embodiments, the described LIDAR system may be implemented in any sensing market, such as, but not limited to, transportation, manufacturing, metrology, medical, virtual reality, augmented reality, and security systems. According to some embodiments, the described LIDAR system is implemented as part of a front-end of a frequency modulated continuous-wave (FMCW) device that assists with spatial awareness for automated driver assist systems, or self-driving vehicles.

LIDAR systems described by the embodiments herein include coherent scan technology to detect a signal returned from a target to generate a coherent heterodyne signal, from which range and velocity information of the target may be extracted. A signal, or multiple signals, may include an up-sweep of frequency (up-chirp) and a down-sweep of frequency (down-chirp), either from a single optical source or from separate optical sources (i.e., one source with an up-sweep and one source with a down-sweep). Accordingly, two different frequency peaks, one for the up-chirp and one for the down-chirp, may be associated with a target and can be used to determine target range and velocity. However, peak images may also occur when the LIDAR system processes the signals. Peak images may include data (e.g., graphical data) that includes signal attributes (e.g., SNR value) that suggests a weak correspondence between a detected peak and the location and/or speed of a target. Hence, if these peak images are used by a LIDAR system to detect a target, the LIDAR system will use faulty data to process location, speed, velocity related to the target. Use of peak images in this fashion may be referred to as "ghosting." Using the techniques described herein, embodiments of the present invention can, among other things, address the issues described above by introducing phase modulations into the sweeps/chirps. This allows the LIDAR system to match the peaks and/or peak images with an expected peak shape to differentiate between the peaks (e.g., true peaks) and peak images. In contrast to image peaks, true peaks include data (e.g., graphical data) that includes signal attributes (e.g., a SNR value) that strongly corresponds to the location and/or speed of a target. Hence, such peaks enable LIDAR systems to reliably identify locations, speeds, velocities of a target. It should be noted that a peak image may also be referred to as an image peak.

Figure 1:
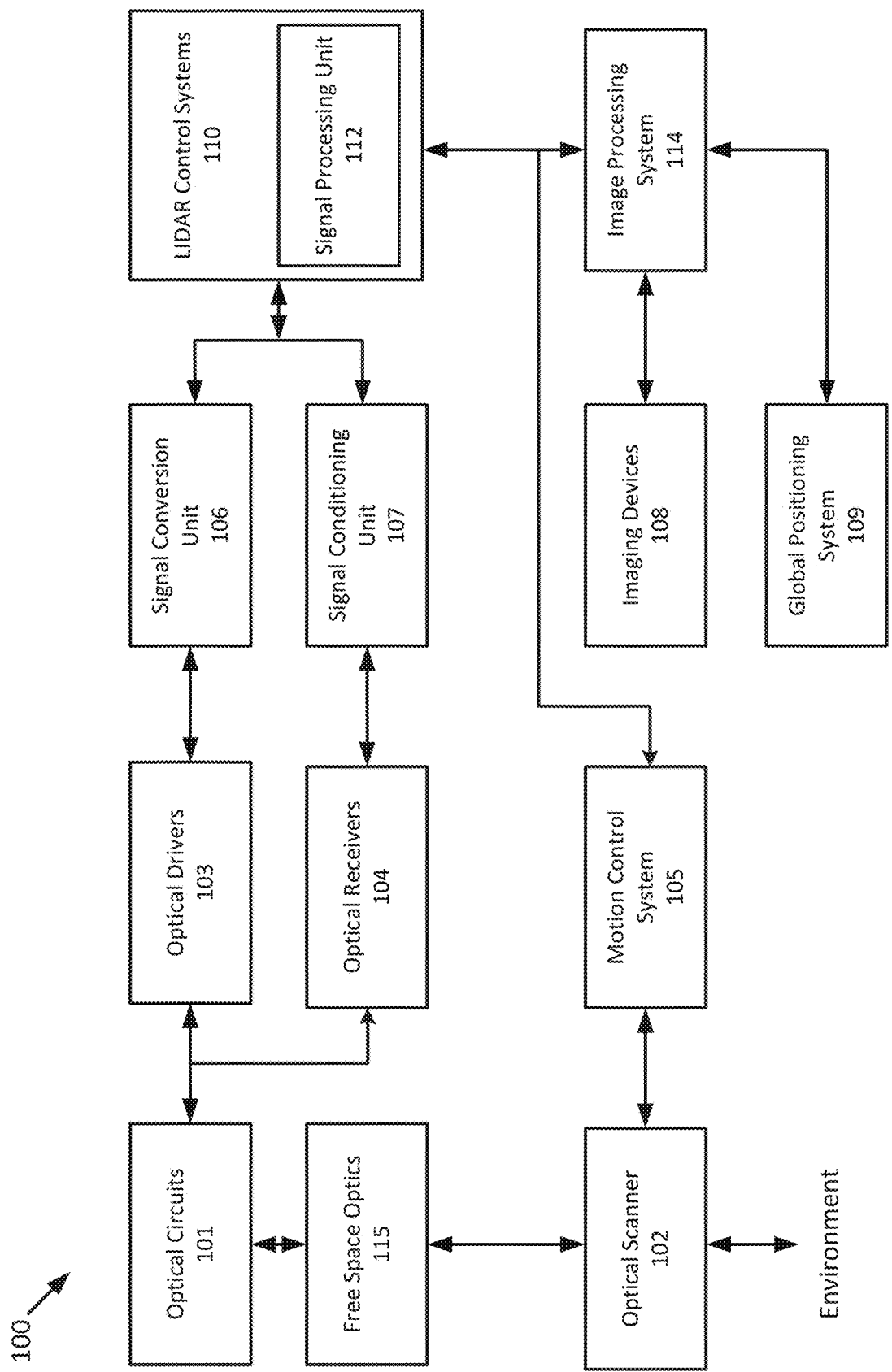
FIG. 1 is a block diagram illustrating an example LIDAR system according to the present disclosure.

FIG. 1 illustrates a LIDAR system 100 according to example implementations of the present disclosure. The LIDAR system 100 includes one or more of each of a number of components, but may include fewer or additional components than shown in FIG. 1. As shown, the LIDAR system 100 includes optical circuits 101 implemented on a photonics chip. The optical circuits 101 may include a combination of active optical components and passive optical components. Active optical components may generate, amplify, and/or detect optical signals and the like. In some examples, the active optical components include optical beams at different wavelengths, and include one or more optical amplifiers, one or more optical detectors, or the like.

Free space optics 115 may include one or more optical waveguides to carry optical signals, and route and manipulate optical signals to appropriate input/output ports of the active optical components. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. The optical scanner 102 also collects light incident upon any objects in the environment into a return optical beam that is returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be a complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. In some examples, the LIDAR control systems 110 may include memory to store data, and instructions to be executed by the processing device. The memory may be, for example, read-only memory (ROM), random-access memory (RAM, programmable read-only memory (PROM), erasable programmable read-only memory (EPROM), electrically erasable programmable read-only memory (EEPROM), flash memory, magnetic disk memory such as hard disk drives (HDD), optical disk memory such as compact-disk read-only (CD-ROM) and compact disk read-write memory (CD-RW), or any other type of non-transitory memory.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay 3D point cloud data with the image data to determine velocity and distance of objects in the surrounding area. The system also processes the satellite-based navigation location data to provide a precise global location.

Figure 2:
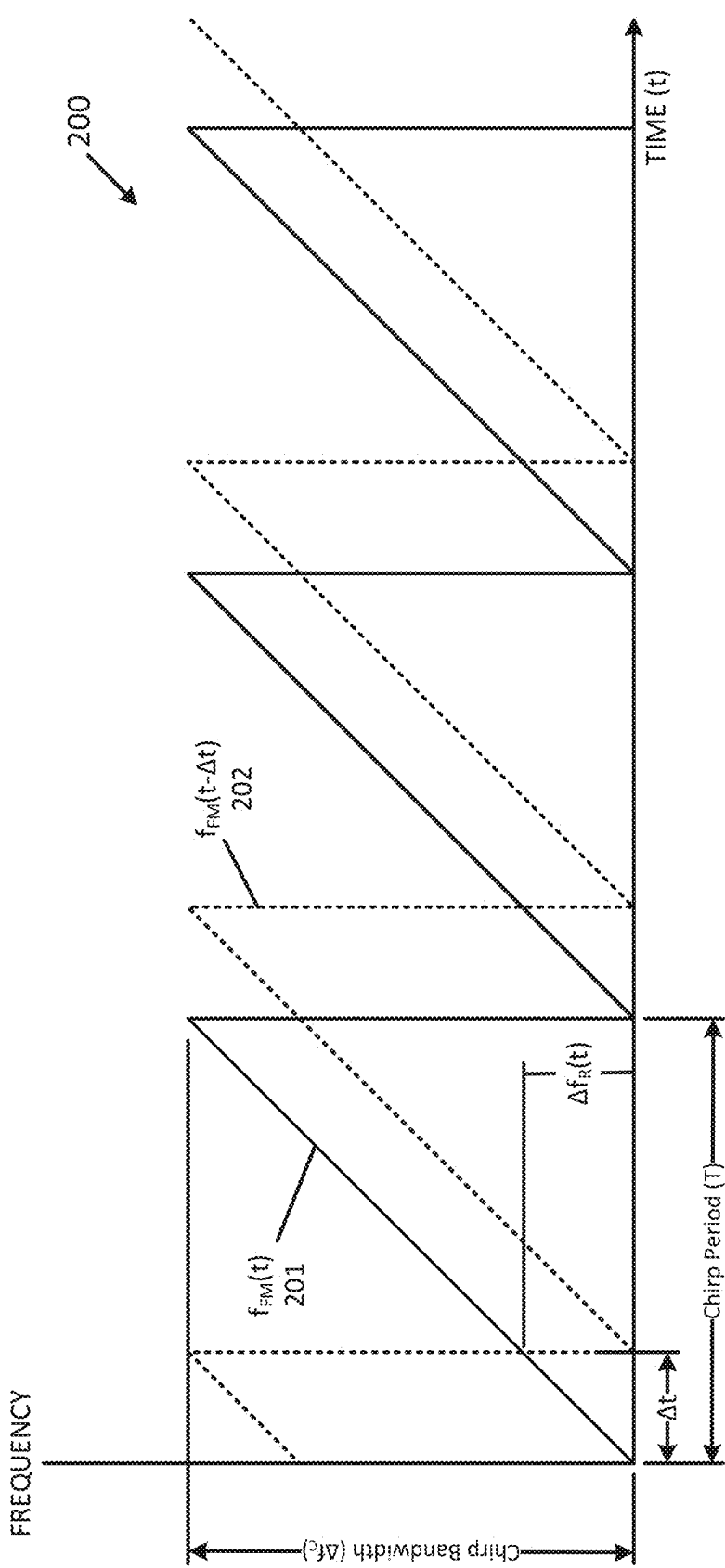
FIG. 2 is a time-frequency diagram illustrating one example of LIDAR waveforms according to the present disclosure.

FIG. 2 is a time-frequency diagram 200 of a scanning signal 201 that can be used by a LIDAR system, such as system 100, to scan a target environment according to some embodiments. In one example, the scanning waveform 201, labeled as fFM(t), is a sawtooth waveform (sawtooth "chirp") with a chirp bandwidth ΔfC and a chirp period TC. The slope of the sawtooth is given as k=(ΔfC/TC). FIG. 2 also depicts target return signal 202 (e.g., a returned signal) according to some embodiments. Target return signal 202, labeled as fFM(t-Δt), is a time-delayed version of the scanning signal 201, where Δt is the round trip time to and from a target illuminated by scanning signal 201. The round trip time is given as Δt=2R/v, where R is the target range and v is the velocity of the optical beam, which is the speed of light c. The target range, R, can therefore be calculated as R=c(Δt/2). When the return signal 202 is optically mixed with the scanning signal, a range dependent difference frequency ("beat frequency") ΔfR(t) is generated. The beat frequency ΔfR(t) is linearly related to the time delay Δt by the slope of the sawtooth k. That is, ΔfR(t)=kΔt. Since the target range R is proportional to Δt, the target range R can be calculated as R=(c/2)(ΔfR(t)/k). That is, the range R is linearly related to the beat frequency ΔfR(t). The beat frequency ΔfR(t) can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also include a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta fRmax$) is 500 megahertz. This limit in turn determines the maximum range of the system as $Rmax=(c/2)(\Delta fRmax/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3A:
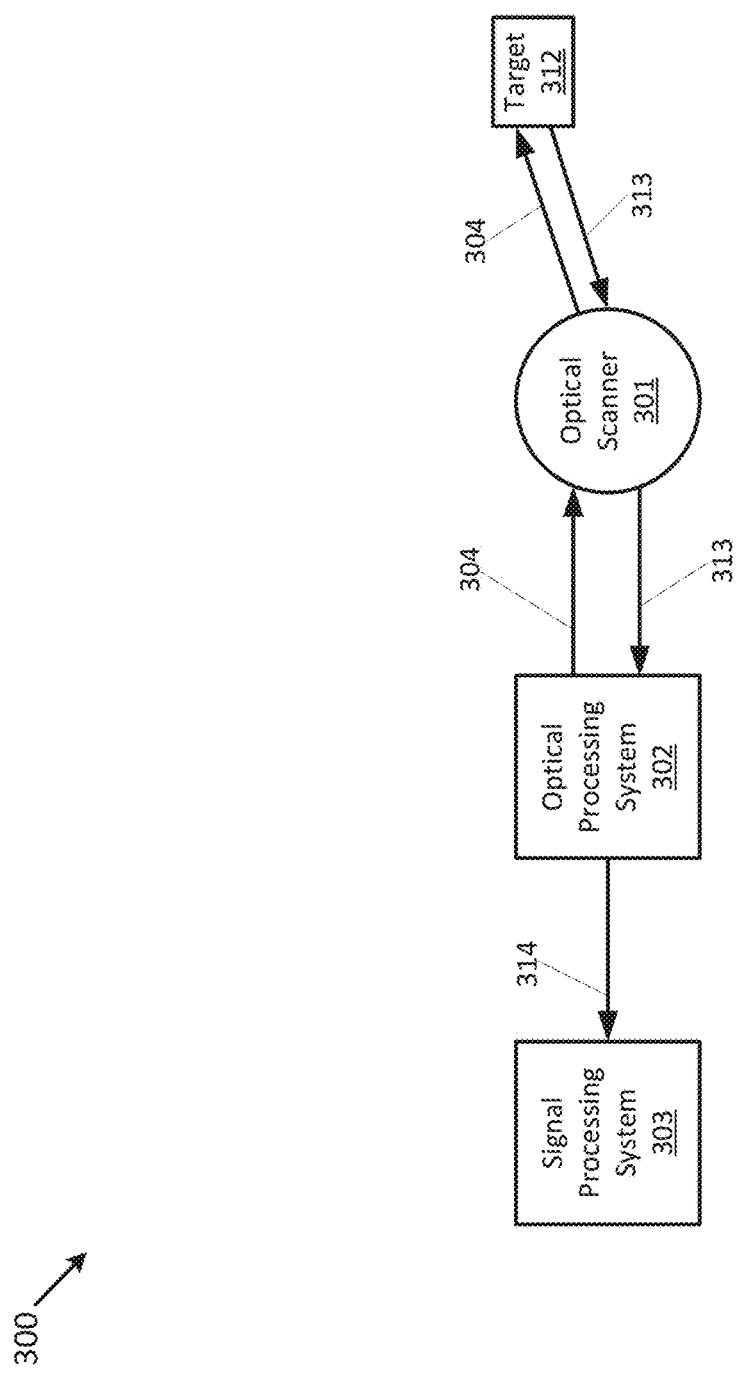
FIG. 3A is a block diagram illustrating an example LIDAR system according to the present disclosure.

FIG. 3A is a block diagram illustrating an example LIDAR system 300 according to the present disclosure. In one example system 300 includes an optical scanner 301 to transmit an optical beam, such as a FMCW (frequency-modulated continuous wave) infrared (IR) optical beam 304 and to receive a return signal 313 from reflections of the optical beam 304 from targets such as target 312 in the field of view (FOV) of the optical scanner 301. System 300 also includes an optical processing system 302 to generate a baseband signal 314 in the time domain from the return signal 313, where the baseband signal 314 contains frequencies corresponding to LIDAR target ranges. Optical processing system 302 may include elements of free space optics 115, optical circuits 101, optical drivers 103 and optical receivers 104 in LIDAR system 100. System 300 also includes a signal processing system 303 to measure energy of the baseband signal 314 in the frequency domain, to compare the energy to an estimate of LIDAR system noise, and to determine a likelihood that a signal peak in the frequency domain indicates a detected target. Signal processing system 303 may include elements of signal conversion unit 106, signal conditioning unit 107, LIDAR control systems 110 and signal processing unit 112 in LIDAR system 100.

Figure 3B:
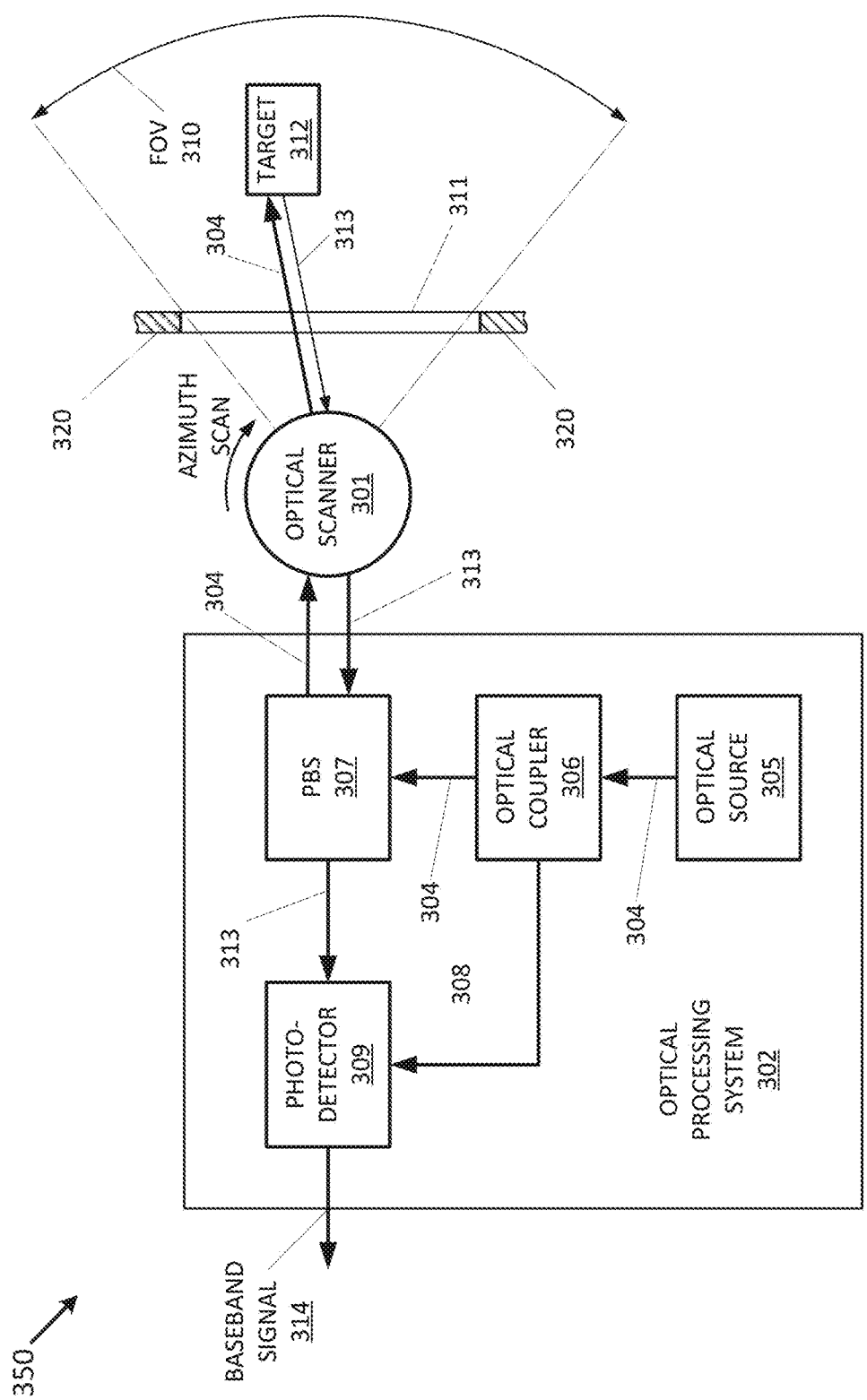
FIG. 3B is a block diagram illustrating an electro-optical optical system according to the present disclosure.

FIG. 3B is a block diagram illustrating an example electro-optical system 350. Electro-optical system 350 includes the optical scanner 301, similar to the optical scanner 102 illustrated and described in relation to FIG. 1. Electro-optical system 350 also includes the optical processing system 302, which as noted above, may include elements of free space optics 115, optical circuits 101, optical drivers 103, and optical receivers 104 in LIDAR system 100.

Electro-optical processing system 302 includes an optical source 305 to generate the optical beam 304. The optical beam 304 may be directed to an optical coupler 306 that is configured to couple the optical beam 304 to a polarization beam splitter (PBS) 307 and a sample 308 of the optical beam 304 to a photodetector (PD) 309. The PBS 307 is configured to direct the optical beam 304, because of its polarization, toward the optical scanner 301. Optical scanner 301 is configured to scan a target environment with the optical beam 304, through a range of azimuth and elevation angles covering the field of view (FOV) 310 of a LIDAR window 311 in an enclosure 320 of the optical system 350. In FIG. 3B, for ease of illustration, only the azimuth scan is illustrated.

As shown in FIG. 3B, at one azimuth angle (or range of angles), the optical beam 304 passes through the LIDAR window 311 and illuminates a target 312. A return signal 313 from the target 312 passes through LIDAR window 311 and is directed by optical scanner 301 back to the PBS 307.

The return signal 313, which will have a different polarization than the optical beam 304 due to reflection from the target 312, is directed by the PBS 307 to the photodetector (PD) 309. In PD 309, the return signal 313 is optically mixed with the local sample 308 of the optical beam 304 to generate a range-dependent baseband signal 314 in the time domain. The range-dependent baseband signal 314 is the frequency difference between the local sample 308 of the optical beam 304 and the return signal 313 versus time (i.e., $\Delta f_R(t)$). The range-dependent baseband signal 314 may be in a frequency domain and may be generated by mixing at least one up-chirp frequency and at least one down-chirp frequency with the return signal 313. The at least one down-chirp frequency may be delayed in time proportional to the relative motion of at least one of the target and the LIDAR system.

Figure 4:
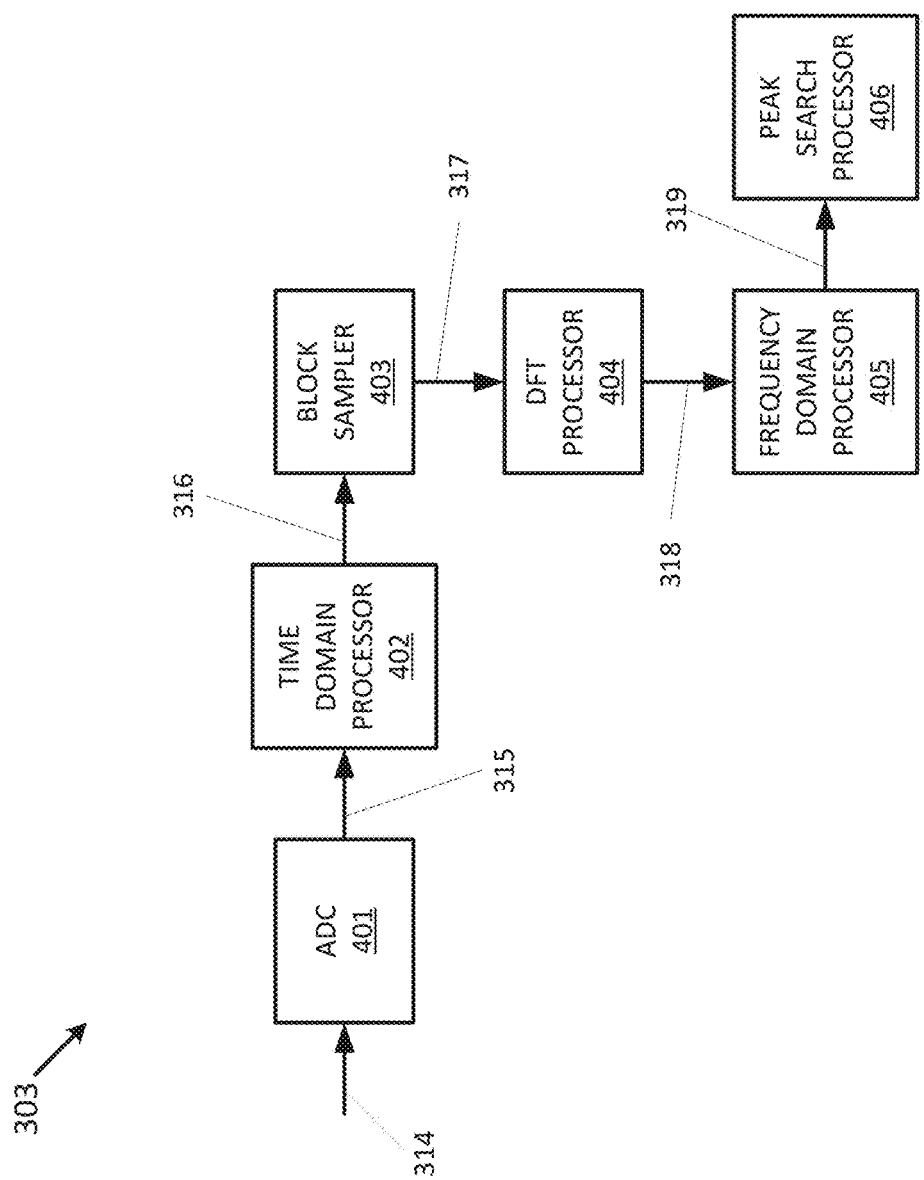
FIG. 4 is a block diagram of an example signal processing system according to the present disclosure.

FIG. 4 is a detailed block diagram illustrating an example of the signal processing system 303, which processes the baseband signal 314 according to some embodiments. As noted above, signal processing unit 303 may include elements of signal conversion unit 106, signal conditioning unit 107, LIDAR control systems 110 and signal processing unit 112 in LIDAR system 100.

Signal processing system 303 includes an analog-to-digital converter (ADC) 401, a time domain signal processor 402, a block sampler 403, a discrete Fourier transform processor 404, a frequency domain signal processor 405, and a peak search processor 406. The component blocks of signal processing system 303 may be implemented in hardware, firmware, software, or some combination of hardware, firmware and software.

In FIG. 4, the baseband signal 314, which is a continuous analog signal in the time domain, is sampled by ADC 401 to generate a series of time domain samples 315. The time domain samples 315 are processed by the time domain processor 402, which conditions the time domain samples 315 for further processing. For example, time domain processor 402 may apply weighting or filtering to remove unwanted signal artifacts or to render the signal more tractable for subsequent processing. The output 316 of time domain processor 402 is provided to block sampler 403. Block sampler 403 groups the time domain samples 316 into groups of N samples 317 (where N is an integer greater than 1), which are provided to DFT processor 404. DFT processor 404 transforms the groups of N time domain samples 317 into N frequency bins or subbands 318 in the frequency domain, covering the bandwidth of the baseband signal 314. The N subbands 319 are provided to frequency domain processor 405, which conditions the subbands for further processing. For example, frequency domain processor 405 may resample and/or average the subbands 319 for noise reduction. Frequency domain processor 405 may also calculate signal statistics and system noise statistics. The processed subbands 319 are then provided to a peak search processor 406 that searches for signal peaks representing detected targets in the FOV of the LIDAR system 300.

Figure 5:
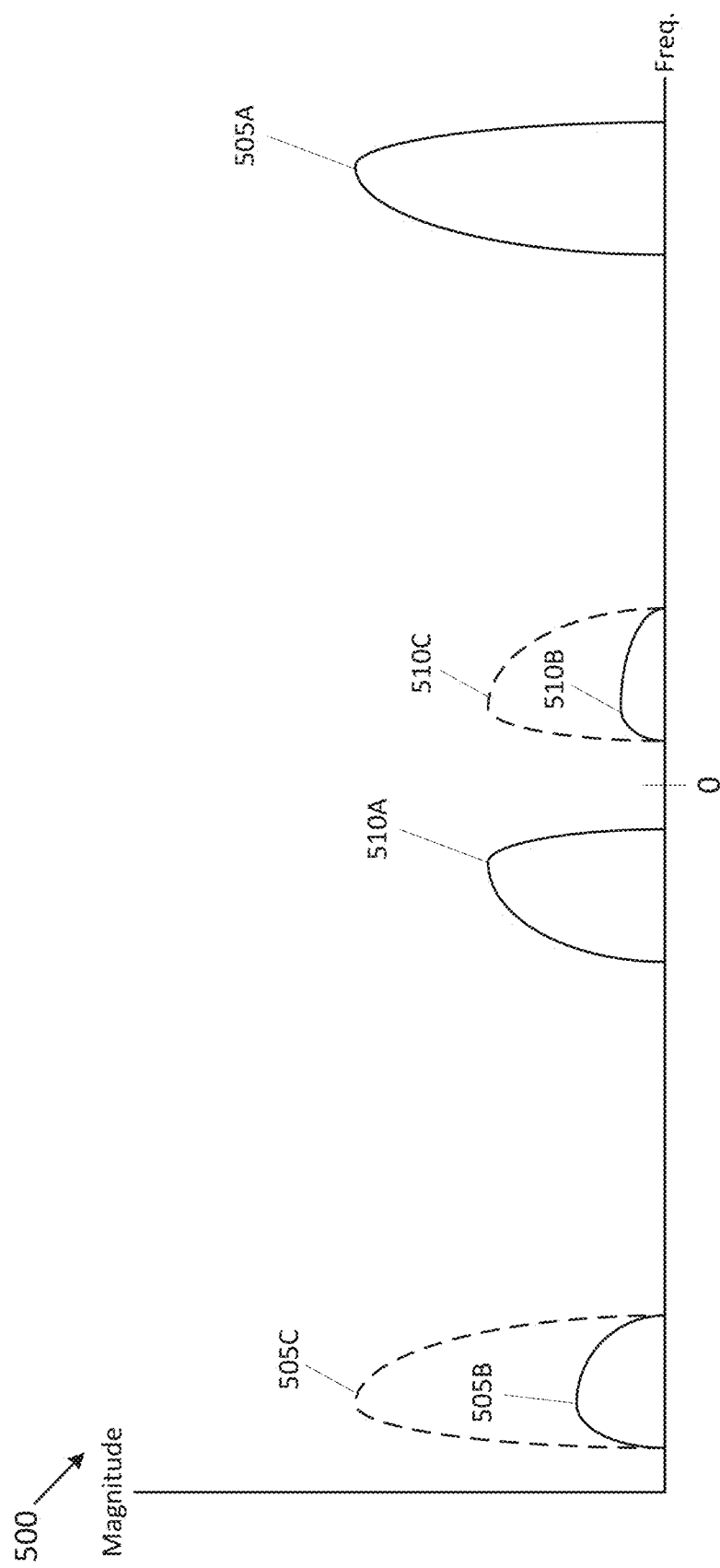
FIG. 5 is a signal magnitude-frequency diagram illustrating signal peaks for a target according to the present disclosure.

FIG. 5 is an example of a signal magnitude-frequency diagram 500 illustrating signal peaks for one or more targets according to some embodiments. An LIDAR system (e.g., a FMCW LIDAR system) may generate an up-chirp and a down-chirp frequency modulation (also referred to herein as up-sweep and down-sweep) to scan an environment and to determine range and velocity of one or more targets within that environment. In one example, a single optical source may generate both the up-chirp and the down-chirp. In another example, the system may include an optical source to generate a signal that includes the up-chirp and another optical source to generate a signal that includes the down-chirp. Using the returned signal and corresponding generated beat frequencies (i.e., peak frequencies) from the up-chirp and down-chirp, a signal processing system can determine one or more of a range of a target and a velocity of the target. For instance, according to some embodiments, the signal processing unit 112 can be configured to determine the range of the target by calculating a distance from the LIDAR system 500 using multiple frequencies corresponding to respective peaks. As discussed above, the signal processing unit 112 may generate a baseband signal in a frequency domain by mixing at least one up-chirp frequency and at least one down-chirp frequency with the one or more returned signals. The at least one down-chirp frequency may be delayed in time proportional to the relative motion of at least one of the target and the LIDAR system 500. The baseband signal may include the peaks 505A, 505B, 510A, and 510B, and may include additional peaks (not illustrated in FIG. 5).

According to some embodiments, the signal processing unit 112 can be configured to determine the velocity of the target using differences between the multiple frequencies corresponding to the peaks. However, as depicted in FIG. 5, there may arise situations in which image peaks (sometimes referred to as "mirror images," "image ghosts" or the like) are also present in the baseband signal. This may cause the LIDAR system to detect false (or "fake") targets rather than desirable "true" targets or peaks (or "true images" or "true peaks").

As illustrated in FIG. 5, the signal magnitude-frequency diagram 500 includes peak 505A, peak 505B, peak 510A, and peak 510B. A frequency of 0 (e.g., 0 hertz, 0 terahertz, etc.) is also indicated in the signal magnitude-frequency diagram 500. Peaks 505A, 505B, 510A and 510B may be present in the baseband signal that is processed and/or analyzed by a signal processing unit of the LIDAR system (e.g., signal processing unit 112 illustrated in FIG. 1), as discussed in more detail below. Peak 505B may be a mirror image of peak 505A. For example, peak 505B is mirrored across the frequency 0 and shares the same properties of peak 505A (e.g., same curvature or shape). Peak 505B may be referred to as a peak image or image peak. Peak 505A may be conjugate symmetric to peak 505B and vice versa. Peak 510B may be a mirror image of peak 510A. For example, peak 510B is mirrored across the frequency 0 and shares the same properties of peak 510A (e.g., same curvature or shape). Peak 510B may also be referred to as a peak image or image peak. In some scenarios, peak 505A is shifted (e.g., moved) upwards in frequency from the location of the target. Peak 505A may be referred to as an upshifted peak, as a Doppler shifted peak, or as $F_{up}$. Peak 510A is shifted downwards in frequency from the location of the target (as indicated by the solid vertical line in the signal magnitude-frequency diagram 500). Peak 510A may be referred to as a downshifted peak, as a Doppler shifted peak, or as $F_{dn}$. The shift in the peaks may be due to, for example, the movement of one or more of the target and/or sensors from a LIDAR system (e.g., a FMCW or similar LIDAR system). For example, the target may be moving, the device (e.g., a vehicle, a smartphone, etc.) that includes the LIDAR sensors (e.g., optical scanner 102 and/or optical circuits 101 illustrated in FIG. 1, etc.) may be moving, or both the target and the device may be moving relative to a particular point.

Because peak 505A has been shifted up (e.g., upshifted) to a higher frequency, peak 505B (e.g., a peak image) is located at a corresponding negative frequency. For example, if peak 505A was shifted to a frequency J, then peak 505B would be located at the frequency −J. In addition, because peak 510A has been shifted down (e.g., downshifted) to a lower frequency, peak 510B (e.g., a peak image) is located at a corresponding positive frequency. Peak 505B may be referred to as $-F_{up}$ and peak 510B may be referred to as $-F_{dn}$. In some embodiments, peak 505A (and corresponding peak 505B) may correspond to the up-chirp signals (e.g., up-chirp signals from a particular target), and 510A (and corresponding peak 510B) may correspond to down-chirp signals. In other embodiments, peak 505A (and corresponding peak 505B) may correspond to the down-chirp signals, and 510A (and corresponding peak 510B) may correspond to the up-chirp signals (e.g., down-chirp signals from a particular target).

In some embodiments, the LIDAR system (e.g., signal processing unit 112 of LIDAR system 100 illustrated in FIG. 1) may be configured to select peak 505A. For instance, when the target is at a closer range (e.g., within a first threshold range of the LIDAR), the peak with the highest frequency (e.g., peak 505A) may be determined to be a true peak corresponding to a target, rather than a peak image, and hence selected by the LIDAR system (e.g., signal processing unit 112 illustrated in FIG. 1). In this fashion, the signal processing unit 112 is configured to select peak 505A based on the type of ghosting that is occurring (e.g., close-range ghosting or far-range ghosting). Thus, the LIDAR (e.g., signal processing unit 112 illustrated in FIG. 1) may be able to determine that the peak 505A should be selected for range and/or distance determinations related to the target. In addition, because the LIDAR system (e.g., signal processing unit 112 illustrated in FIG. 1) has determined that the peak 505A is a true peak (and not a peak image), the LIDAR system may also determine that peak 505B (which has the negative frequency of peak 505A) is a peak image. In some embodiments, the LIDAR system may be configured to discard peak 505B (e.g., discard peak images).

As discussed above, there may arise situations in which peak images (e.g., peaks 505B and 510B) are also present. For example, due to hardware and computational resources, the beat signal may undergo real sampling and frequency peaks may be assumed to be positive. However, if the target is at a closer range (e.g., within a first threshold range of the LIDAR system), a negative Doppler shift can cause a beat frequency peak to become negative. For example, due to downshifting, the peak 510A can have a negative frequency. In contrast to embodiments of the present disclosure, this may cause conventional systems to select peak 510B instead of peak 510A when determining the location of the target. For example, when peak 505A and peak 510A are used, the target location may be determined as follows: $(F_{up}-F_{dn})/2$. Thus, the target (e.g., the true target location) would likely be determined to be towards the middle of peak 505A and peak 510A (not depicted). However, if peak 505A and peak 510B are used, the target location (e.g., the location of a ghost or ghost target) may be determined as follows: $(F_{up}+F_{dn})/2$.

If there is no Doppler shift, the peaks in the baseband signal may be at positive frequencies. However, due to Doppler shift, peaks corresponding to close range targets might shift to negative frequencies that are close to 0 Hz and peaks corresponding to far range targets might shift to negative frequencies that close to −((sampling frequency)/2). Thus, the LIDAR system should determine which peaks correspond to the true peak and if a false peak is selected a ghosting may occur (e.g., a ghost image may be detected by the LIDAR system). Without IQ processing, the peak 505B may have the same height (e.g., magnitude) and shape as peak 505C, and the peak 510B may have the same height (e.g., magnitude) and shape as peak 510C. If the peak 505B remains at the height/magnitude of peak 505C and the peak 510B remains at the height/magnitude of peak 510C, this may cause the LIDAR system 100 to select the wrong peak (e.g., peak 505B and/or 510B) when determining the location, velocity, and/or reflectivity of the target.

In one embodiment, the LIDAR system (e.g., signal processing unit 112 of LIDAR system 100 illustrated in FIG. 1) may perform in-phase quadrature phase (IQ) processing on the returned signals (e.g., received signals). The IQ processing of the returned signals may allow the LIDAR system to identify true peaks within the baseband signal more easily, quickly, efficiently, etc., as discussed in more detail below.

In one embodiment, the LIDAR system (e.g., signal processing unit 112 of LIDAR system 100 illustrated in FIG. 1) may perform IQ processing on the returned signals by generating a quadrature signal and an in-phase signal based on the returned signals. The quadrature signal may be shifted 90 degrees from the in-phase signal. The LIDAR system may generate the in-phase signal by downshifting a returned signal by the corresponding transmitted signal (e.g., a local copy of the signal that was transmitted). For example, a mixing module may receive the returned signal and the corresponding transmitted signal, and may downshift the returned signal by the corresponding transmitted signal. The LIDAR system may generate the quadrature signal by downshifting the returned signal by a 90-degree phase shifted version of the corresponding transmitted signal (e.g., by phase shifting the corresponding transmitted signal by 90 degrees). For example, another mixing module may receive the returned signal and 90-degree phase shifted version of the corresponding transmitted signal, and may downshift the returned signal by the 90-degree phase shifted version of the corresponding transmitted signal. The 90-degree phase shifted version of the corresponding transmitted signal may be generated by a phase shifting module, as discussed in more detail below.

In one embodiment, the LIDAR system (e.g., signal processing unit 112 of LIDAR system 100 illustrated in FIG. 1) may add (e.g., combine, mix, etc.) the in-phase signal and the quadrature signal to generate a combined signal. The combined signal may also be referred to as a mixed signal, an aggregate signal, a summed signal, etc. The LIDAR system may also perform a fast Fourier transform (FFT) on the combined signal. For example, the combined signal may be provided to a FFT module which may apply a fast Fourier transform to the combined signal to generate the frequency spectrum of the baseband signal.

In one embodiment, the combined signal may be a complex signal (e.g., a signal that includes a complex or imaginary component). Because the combined signal is a complex signal, the fast Fourier transform of the combined signals may no longer be symmetric. For example, prior to the IQ processing, the peak 505B (e.g., an image peak) may be an exact mirror image of the peak 505A (e.g., the peak 505B would be the same magnitude/height as peak 505A). However, after IQ processing the magnitude/height of peak 505B may be reduced, suppressed, minimized, etc., when compared to the magnitude/height of peak 505A. In another example, prior to the IQ processing, the peak 510B (e.g., an image peak) may be an exact mirror image of the peak 510A (e.g., the peak 510B would be the same magnitude/height as peak 510A). However, after IQ processing the magnitude/height of peak 510B may be reduced, suppressed, minimized, etc., when compared to the magnitude/height of peak 510A. The combined signals (e.g., complex signals) may be represented as I+(j*Q), where I is the in-phase signal, Q is the quadrature signal, and j is an imaginary unit.

In one embodiment, the LIDAR system (e.g., signal processing unit 112 of LIDAR system 100 illustrated in FIG. 1) may combine (e.g., add) the in-phase signal and the quadrature signal by subtracting the quadrature signal from the in-phase signal if the transmitted signal was an up-chirp. For example, if the corresponding transmitted signal (for a returned signal) had an up-sweep of frequency, the LIDAR system may combine the in-phase signal and the quadrature signal by subtracting the signal j*Q from the in-phase signal (or by adding a negative of the signal j*Q to the in-phase signal).

In one embodiment, the LIDAR system (e.g., signal processing unit 112 of LIDAR system 100 illustrated in FIG. 1) may combine the in-phase signal and the quadrature signal by adding the quadrature signal to the in-phase signal if the transmitted signal was a down-chirp. For example, if the corresponding transmitted signal (for a returned signal) had a down-sweep of frequency, the LIDAR system may add the in-phase signal and the quadrature signal multiplied by j to generate a complex signal.

In one embodiment, the LIDAR system (e.g., signal processing unit 112 of LIDAR system 100 illustrated in FIG. 1) may determine one or more of a target location (e.g., the location of the target), a target velocity (e.g., a velocity of the target), and a target reflectivity (e.g., the reflectivity of the target) using peaks 505A, 505B, 510A, and 510B. For example, after IQ processing, the magnitude/height of the peaks 505B and 510B (e.g., the images peaks) may be reduced or suppressed. The LIDAR system may use the peaks with the highest magnitude/height to determine (e.g., calculate) one or more of the location, velocity, and reflectivity of the target. For example, the LIDAR system may select peak 505A from the set of peaks (e.g., pair of peaks) that includes peak 505A and 505B. The LIDAR system may also select peak 510A from the set of peaks (e.g., pair of peaks) that includes peak 510A and 510B. The LIDAR system may determine the location, velocity, and reflectivity of the target based on peaks 505A and 510A.

In one embodiment, the LIDAR system (e.g., signal processing unit 112 of LIDAR system 100 illustrated in FIG. 1) may subtract the signal j*Q from the in-phase signal for an up-chirp and add the quadrature signal to the in-phase signal for a down-chirp to reduce a range of frequencies that is processed to determine one or more of the target location, the target velocity, and the target reflectivity. Without Doppler shift, the beat frequency $F_{peak}$ for a given chirp would be equal to the chirp rate ($\alpha$), multiplied by the delay/time to the target and back to the LIDAR system ($\tau$). The beat frequency without Doppler shift may be represented as $F_{peak}=\alpha*\tau$. For an up-sweep, $\alpha$ would be positive, thus $F_{peak}$ would be at positive frequencies and a corresponding image peak would be at negative frequencies. For a down-sweep, $\alpha$ would be negative thus $F_{peak}$ would be at negative frequencies and a corresponding image peak would be at positive frequencies. To reduce the range or amount of frequencies that are processed by the LIDAR system, the combined signal may be determined (e.g., generated, computed, constructed, etc.) as I−(j*Q) for up-chirps and I+(j*Q) for down-chirps. This may cause all of the true peaks to be at positive frequencies in the absence of doppler shift. For example, this may cause the location of peak 510A to be at a positive frequency. This may allow the LIDAR system to process (e.g., analyze, scan, etc.) a smaller range or amount of frequencies (e.g., the positive frequencies) when identifying the true peaks (e.g., peaks 505A and 510A). If there is Doppler shift, the beat frequency for a chirp may be represented as $F_{peak}=|\alpha|*\tau+D$, where D is the Doppler shift. Thus one or more of the true peaks may be located at negative frequencies due to the Doppler shift. However, for a specified maximum Doppler shift $D_{max}$, the true peak location may be limited to negative frequencies in the range of $-D_{max}$ to 0 or $-F_{sample}/2$ to $-F_{sample}/2-D_{max}$. To reduce the range or amount of frequencies that are processed by the LIDAR system, the combined signal may be determined (e.g., generated, computed, constructed, etc.) as I+(j*Q) for up-chirps and I−(j*Q) for down-chirps. This may cause all of the true peaks to be at negative frequencies. With Doppler shift, the true peaks may be located at certain positive frequencies. The LIDAR system is able to process a smaller range or amount of frequencies (e.g., the negative frequencies) when identifying the true peaks (e.g., peaks 505A and 510A).

In one embodiment, the LIDAR system (e.g., signal processing unit 112 of LIDAR system 100 illustrated in FIG. 1) may determine whether the target is within one or more sets of ranges where ghosting can occur. For example, referring to FIG. 7, the LIDAR system may determine whether any of the peaks associated with the target is within a close ghosting range (e.g., a range of frequencies where close range ghosting may occur) or a far ghosting range (e.g., a range of frequencies where far range ghosting may occur). The LIDAR system may use the true and image peak locations to determine or estimate whether ghosting may occur (e.g., whether it is possible for ghosting to occur). If any of the target frequency peaks is within one or more sets of frequency ranges where ghosting can occur, the LIDAR system may perform IQ processing, as discussed above. If the target is not within one or more sets of ranges where ghosting can occur, the LIDAR system may refrain from performing IQ processing (e.g., may not perform IQ processing) and perform real processing instead. For example, the LIDAR system may refrain from using IQ circuit, modules, components, etc.

In one embodiment, the LIDAR system may vary, adjust, modify, etc., the set of frequency ranges where ghosting may occur based on the velocity of the LIDAR system. For example, the LIDAR system may increase/decrease the boundaries of the set of frequency ranges where ghosting may occur, based on the speed/velocity (e.g., ego velocity) of the vehicle where the LIDAR system is located.

Figure 6:
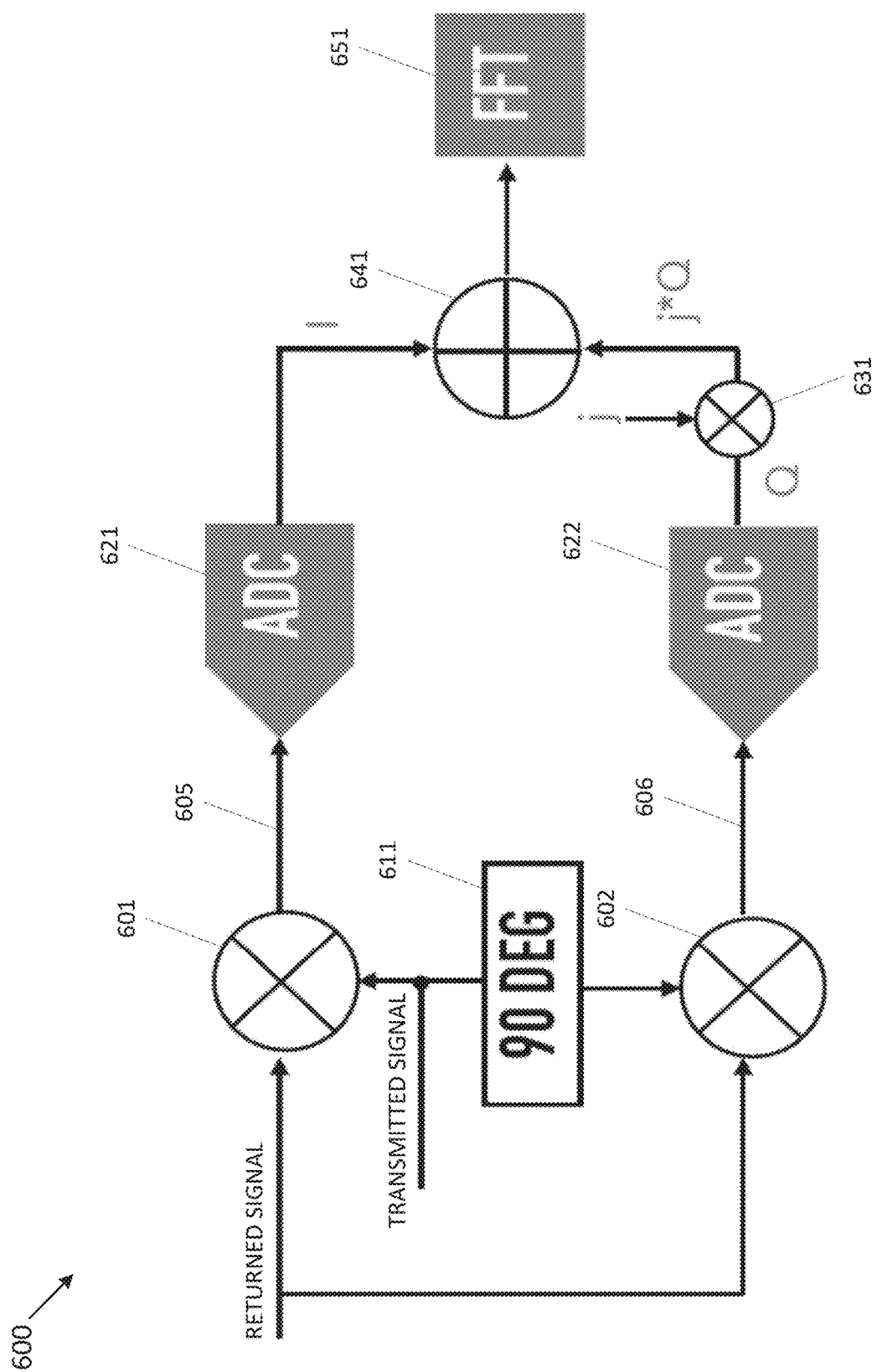
FIG. 6 is a block diagram of an example signal processing system for selecting peaks according to the present disclosure.

FIG. 6 is a block diagram of an example processing module 600 for selecting (e.g., determining, picking, calculating, etc.) peaks according to the present disclosure. The processing module 600 may be part of a signal processing system of a LIDAR system. For example, the processing module 600 may be part of the signal processing system 303 of the LIDAR system 300, as illustrated in FIG. 3A and FIG. 4. In another example, the processing module 600 may be part of signal processing unit 112 illustrated in FIG. 1. In a further example, portions of the processing module 600 may be included in the time domain processor 402 and the DFT process 404 of the signal processing system 303, as illustrated in FIG. 4. The processing module includes a mixing module 601, a mixing module 602, a shifting module 611, an analog-digital-converter (ADC) 621, an ADC 622, a mixing module 631, a combining module 641, and a FFT module 651. Each of the mixing module 601, the mixing module 602, the shifting module 611, the ADC 621, the ADC 622, the mixing module 631, the combining module 641, and the FFT module 651 may be hardware, software, firmware, or a combination thereof.

As discussed above, the processing module 600 may receive a returned signal (e.g., target return signal 202 illustrated in FIG. 2) and may provide the returned signal to the mixing module 601 and the mixing module 602. The mixing module 601 may mix, shift, downshift, etc., the returned signal by a transmit signal (which corresponds to the returned signal) to generate a downshifted signal 605. The downshifted signal 605 may be provided to the ADC 621 which may generate an in-phase signal (I) based on the downshifted signal 605.

The shifting module 611 may shift the transmitted signal by 90 degrees and may provide the 90-degree shifted transmitted signal to the mixing module 602. The mixing module 602 may mix, shift, downshift, etc., the returned signal by the 90-degree shifted transmitted signal to generate a downshifted signal 606. The downshifted signal 606 may be provided to the ADC 622 which may generate a quadrature signal (Q) based on the downshifted signal 606. The quadrature signal is provided to mixing module 631. The mixing module 631 also receives a complex or imaginary component j. The mixing module 631 may mix the quadrature signal Q with the imaginary component j to generate the signal j*Q.

The in-phase signal I and the signal j*Q are provided to the combining module 641 which may combine the in-phase signal I and the signal j*Q to generate a combined signal (I+(j*Q)). The combined signal I+(j*Q) is provided to the FFT module 651 which may perform a FFT on the combined signal I+(j*Q) to generate a baseband signal.

As discussed above, the FFT of the combined signal I+(j*Q) may no longer be symmetric because the combined signal I+(j*Q) is a complex signal. After the FFT of the combined signal, the magnitude/height of the image peaks may be reduced, suppressed, minimized, etc., when compared to the magnitude/height of the true peaks. This allows the LIDAR system to identify the true peaks more easily, quickly, efficiently, etc.

Also as discussed above, the LIDAR system may determine if the frequency peaks associated with the target are within one or more sets of frequency ranges where ghosting can occur. If the target is not within one or more sets of ranges where ghosting can occur, the LIDAR system may refrain from performing IQ processing (e.g., may not perform IQ processing). For example, the LIDAR system may power down or refrain from using the mixing module 602, the shifting module 611, the ADC 622, and the mixing module 631.

Figure 7A:
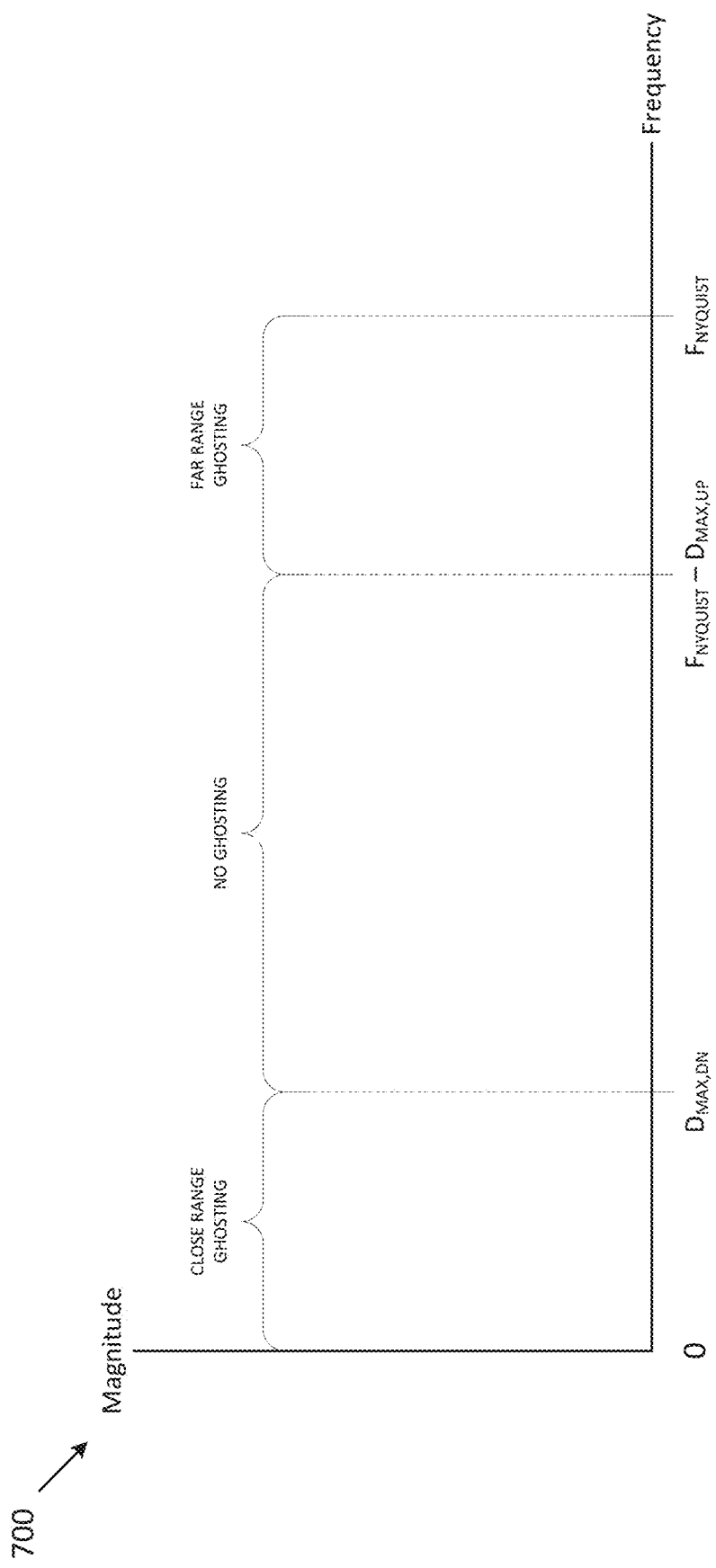
FIG. 7A is a magnitude-frequency diagram illustrating frequency ranges according to the present disclosure.

FIG. 7A is a signal magnitude-frequency diagram 700 illustrating frequency ranges according to the present disclosure. A frequency of 0 (e.g., 0 hertz, 0 terahertz, etc.) is illustrated in the signal magnitude-frequency diagram 700. Frequency $D_{MAX, DN}$ is also illustrated in the signal magnitude-frequency diagram 700. $D_{MAX, DN}$ may be a maximum or threshold negative Doppler shift (e.g., a Doppler shift that occurs when an object is moving away from the LIDAR system) that the LIDAR system may be able to account for when detecting objects. Signal magnitude-frequency diagram 700 also refers to $D_{MAX, UP}$. $D_{MAX, UP}$ may be a maximum or threshold positive Doppler shift (e.g., a Doppler shift that occurs when an object is moving towards from the LIDAR system) that the LIDAR system may be able to account for when detecting objects. The Nyquist frequency $F_{NYQUIST}$ is also illustrated in the signal magnitude-frequency diagram 700. In addition, the frequency $F_{NYQUIST}-D_{MAX, UP}$ is also illustrated in the signal magnitude-frequency diagram 700.

The range of frequencies between 0 and $D_{MAX, DN}$ may be a first range of frequencies where closer/close range ghosting may occur. The range of frequencies between $F_{NYQUIST}-D_{MAX, UP}$ and $F_{NYQUIST}$ may be a second range of frequencies where far range ghosting may occur. The range of frequencies between $D_{MAX, DN}$ and $F_{NYQUIST}-D_{MAX, UP}$ may be a third range of frequencies where ghosting may not occur.

To determine whether close/closer range or far range ghosting could occur the LIDAR may analyze the peaks that are detected. In some embodiments, if a positive peak of a first chirp/sweep is less than $D_{MAX, DN}$, and the positive peak of a second chirp/sweep is less than $2*D_{MAX, DN}$, close range ghosting mitigation may be applied. In other embodiments, if the positive peak of either the first chirp/sweep is greater than $F_{NYQUIST}-D_{MAX, UP}$, and the positive peak of the second chirp/sweep is greater than $(F_{NYQUIST}-(2*D_{MAX, UP}))$, far range ghosting mitigation may be applied. In further embodiments, if both positive peaks are in the range $(D_{MAX, DN}, F_{NYQUIST}-D_{MAX, UP})$, no ghosting mitigation (e.g., no IQ processing) may need to be applied.

In some embodiments, instead of detecting peaks to determine whether closer or far range ghost mitigation should be used, the LIDAR may use energy detection. For example, peak detection may use more computational resources (e.g., processing resources, processing capacity, processing power) and/or memory. Peak detection may also take more time to perform. Detecting the total amount of energy (e.g., energy detection) within a range of frequencies, rather than detecting peaks may allow the LIDAR to determine which type of ghost mitigation should be used more quickly and/or efficiently.

Figure 7B:
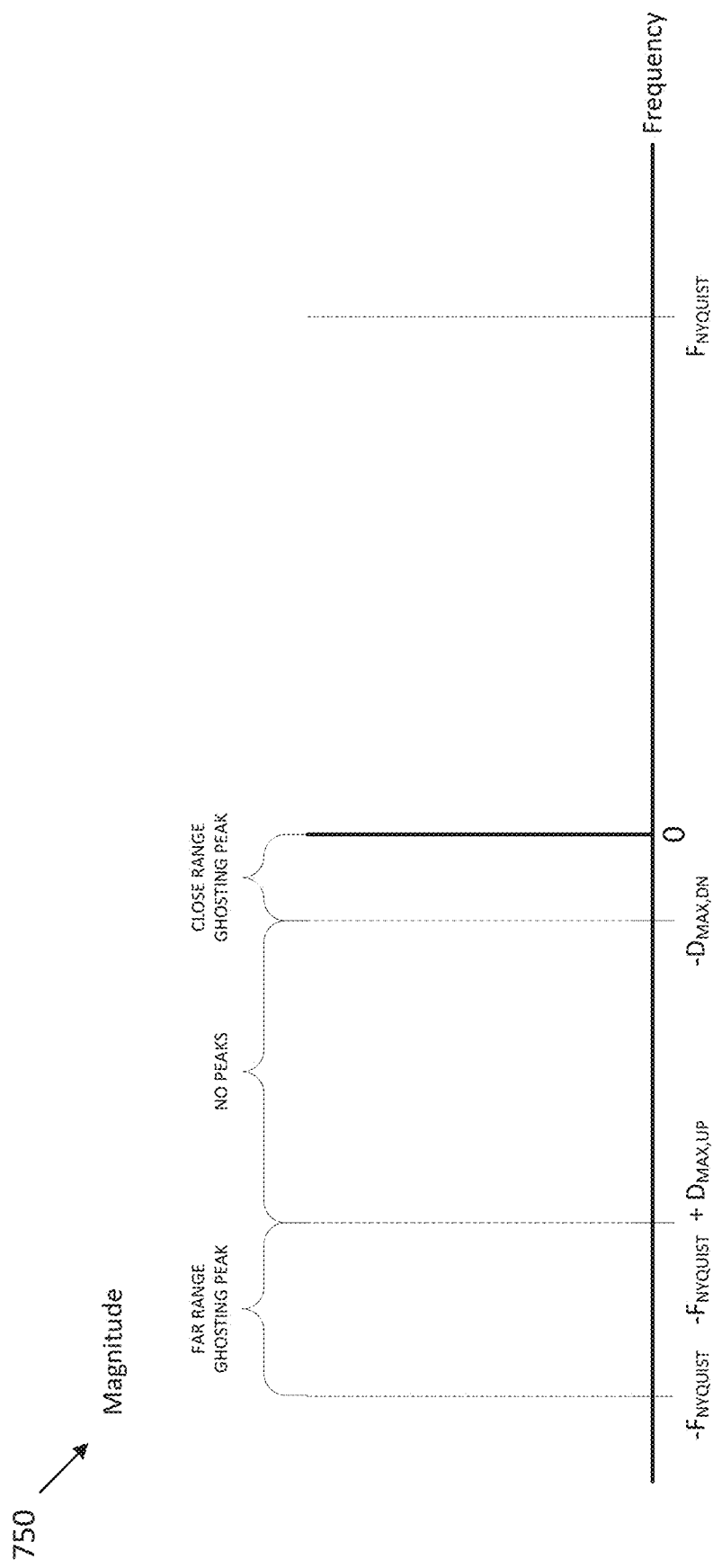
FIG. 7B is a magnitude-frequency diagram illustrating frequency ranges according to the present disclosure.

FIG. 7B is a signal magnitude-frequency diagram 750 illustrating frequency ranges according to the present disclosure. A frequency of 0 (e.g., 0 hertz, 0 terahertz, etc.) is illustrated in the signal magnitude-frequency diagram 700. Frequencies $-F_{NYQUIST}$, $-F_{NYQUIST}+D_{MAX, UP}$, $-D_{MAX, DN}$, and $F_{NYQUIST}$ are also illustrated in the signal magnitude-frequency diagram 750. $D_{MAX}$ may be a maximum or threshold Doppler shift (e.g., a Doppler shift that occurs when an object is moving away from the LIDAR system) that the LIDAR system may be able to account for when detecting objects.

As discussed above, a combined signal may be determined (e.g., generated, computed, constructed, etc.) as I−(j*Q) for up-chirps and I+(j*Q) for down-chirps to reduce the range or amount of frequencies that are processed by the LIDAR system. This may cause all of the true peaks to be at positive frequencies in the absence of Doppler shift. When the true peaks are at the positive frequencies, the LIDAR system may scan for peaks at the positive frequencies only (e.g., may not scan for peaks at negative frequencies). Alternatively, the combined signal may be determined as I+(j*Q) for up-chirps and I−(j*Q) for down-chirps. This may cause all of the true peaks to be at negative frequencies. When the true peaks are at the negative frequencies, the LIDAR system may scan for peaks at the negative frequencies only (e.g., may not scan for peaks at positive frequencies).

In the case where the true peaks are forced to be at positive frequencies in the absence of Doppler shift, the presence of Doppler shift may cause the peaks to move to negative frequencies. If close range ghosting is occurring, the true peak may be in the range of frequencies between− DMAX,DN and 0. The LIDAR system may scan for true peaks in the range of frequencies between− DMAX,DN and 0. If far range ghosting is occurring, a true peak may be in the range of frequencies between FNYQUIST and (FNYQUIST+DMAX), which will get aliased into the range −FNYQUIST to (−FNYQUIST+DMAX,UP). The LIDAR system may scan for true peaks in the range of frequencies between −FNYQUIST and −FNYQUIST+DMAX,UP. True peaks cannot be located between the frequencies −(FNYQUIST −DMAX,UP) and— DMAX,DN. The LIDAR system may not scan the range of frequencies between −(FNYQUIST −DMAX,UP) and— DMAX,DN. By analyzing certain ranges of frequencies (e.g., between FNYQUIST and (FNYQUIST+DMAX,UP)) and refraining from analyzing other ranges of frequencies (e.g., between (FNYQUIST+DMAX,UP) and— DMAX,DN), the LIDAR system identifies true peaks more quickly and/or efficiently (e.g., using less energy or processing power). In the case where the true peaks are forced to be at negative frequencies in the absence of Doppler shift, the presence of Doppler shift could still move peaks to positive frequencies.

Figure 8:
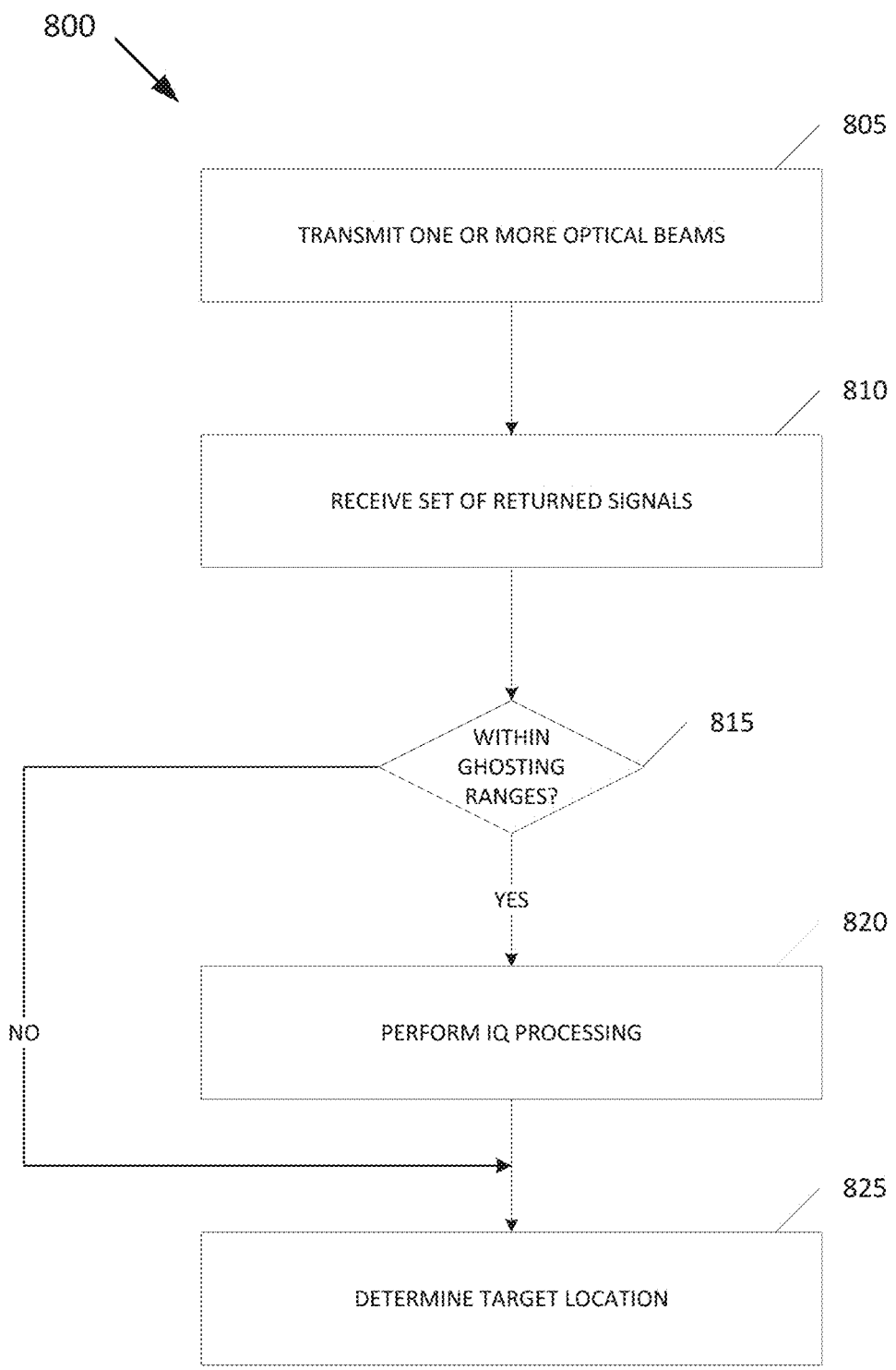
FIG. 8 is a flowchart illustrating a method for selecting peaks according to the present disclosure.

FIG. 8 is a flowchart illustrating a method 800 in a LIDAR system, such as LIDAR system 100 or LIDAR system 300, for selecting peaks according to the present disclosure. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 800 may be performed by a signal processing system of a LIDAR system (e.g., the signal processing system 303 of the LIDAR system 300, as illustrated in FIG. 3A and FIG. 4).

The method 800 begins at operation 805 where the processing logic transmits one or more optical beams comprising an up-chirp frequency modulation and a down-chirp frequency modulation toward a target in a field of view of a light detection and ranging (LIDAR) system. Optionally, the processing logic may introduce phase modulations into the one or more optical beams. At operation 810, the processing logic receives one or more returned signals of the up-chirp and the down-chirp as reflected from the target.

The processing logic may determine whether target peaks are within one or more ghosting ranges (e.g., is within a distance where either far range ghosting or close range ghosting may occur) at block 815. If the target is not within one or more ghosting ranges, the processing logic may determine the target location based on a baseband signal at operation 825, as discussed above in FIG. 5. The processing logic may also optionally set, determine, adjust, vary, etc., the ghosting ranges based on the velocity of the LIDAR system at operation 815.

If the target is within one or more ghosting ranges, the processing logic may perform IQ processing at block 820, as discussed above in FIG. 5. For example, the processing logic may generate in-phase and quadrature signals, may combine the quadrature signal with an imaginary unit (e.g., j), may perform a FFT on the combined signal, etc. The IQ processing may decrease, suppress, etc., the magnitude/height of the image peaks in the baseband signal. At block 825, the processing logic may determine the target location based on the peaks with the highest magnitude/height (e.g., the true peaks) in the baseband signal.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary.

Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operations may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
    transmitting, toward a target in a field of view of a light detection and ranging (LIDAR) system, one or more optical beams comprising at least one up-chirp frequency and at least one down-chirp frequency;
    receiving, from the target, a set of returned signals based on the one or more optical beams;
    determining a plurality of frequency peaks associated with the target based on the set of returned signals;
    determining whether the plurality of frequency peaks associated with the target are within one or more sets of frequency ranges comprising signal attribute values corresponding to a lower likelihood of accurately calculating a location or speed of the target;
    provided the frequency peaks associated with the target are within the one or more sets of frequency ranges, performing in-phase quadrature phase (IQ) processing on the one or more received signals wherein the IQ processing reduces one or more magnitudes of one or more peaks of the plurality of frequency peaks associated with the target; and
    determining one or more of the target location, a target velocity, and a target reflectivity using the plurality of frequency peaks associated with the target.

2. The method of claim 1, wherein:
    the peaks associated with the target comprise a first set of peaks and a second set of peaks;
    the first set of peaks comprises a first true peak and a first image peak;
    the second set of peaks comprises a second true peak and a second image peak; and
    the IQ processing reduces a first magnitude of the first image peak and a second magnitude of the second image peak.

3. The method of claim 2, wherein determining the target location using the first set of peaks and the second set of peaks comprises:
    selecting the first true peak from the first set of peaks and the second true peak from the second set of peaks; and
    determining the target location based on the first true peak and the second true peak.

4. The method of claim 1, wherein the one or more sets of frequency ranges are based on an ego-velocity of the LIDAR system.

5. The method of claim 1, wherein performing IQ processing comprises:
    generating a first signal and second signal based on the set of returned signals, wherein the first signal is shifted 90 degrees from the second signal;
    generating a third signal, wherein the third signal comprises a combination of the first signal and an imaginary unit; and
    combining the third and the second signal to generate a combined signal.

6. The method of claim 5, wherein performing IQ processing further comprises:
    applying a fast Fourier transformer to the combined signal.

7. The method of claim 5, wherein combining the third and the second signal comprises:
    subtracting the third signal from the second signal for an up-chirp and adding the third signal to the second signal for a down-chirp; or
    adding the third signal to the second signal for an up-chirp and subtracting the third signal from the second signal for a down-chirp.

8. The method of claim 7, wherein subtracting the third signal from the second signal for an up-chirp and adding the third signal to the second signal for a down-chirp reduces a range of frequencies that is processed to determine one or more of the target location, the target velocity, and the target reflectivity.

9. The method of claim 1, further comprising:
    provided the peaks associated with the target are not within the one or more sets of frequency ranges, refraining from using in-phase quadrature phase (IQ) circuitry.

10. A light detection and ranging (LIDAR) system, comprising:
    an optical scanner to transmit one or more optical beams comprising at least one up-chirp frequency and at least one down-chirp frequency toward a target in a field of view of the LIDAR system and receive a set of returned signals based on the one or more optical beams;

an optical processing system coupled to the optical scanner to generate a baseband signal in a time domain from the return signal, the baseband signal comprising frequencies corresponding to LIDAR target ranges; and a signal processing system coupled to the optical processing system, comprising:
a processing device; and
a memory to store instructions that, when executed by the processing device, cause the LIDAR system to:
determine a plurality of frequency peaks associated with the target based on the set of returned signals;
determine whether the plurality of frequency peaks associated with the target are within one or more sets of frequency ranges comprising signal attribute values corresponding to a lower likelihood of accurately calculating a location or speed of the target;
provided the frequency peaks associated with the target are within the one or more sets of frequency ranges, perform in-phase quadrature phase (IQ) processing on the one or more received signals wherein the IQ processing reduces one or more magnitudes of one or more peaks of the plurality of frequency peaks associated with the target; and
determine one or more of the target location, a target velocity, and a target reflectivity using the plurality of frequency peaks associated with the target.

11. The LIDAR system of claim 10, wherein:
the peaks associated with the target comprise a first set of peaks and a second set of peaks;
the first set of peaks comprises a first true peak and a first image peak;
the second set of peaks comprises a second true peak and a second image peak; and
the IQ processing reduces a first magnitude of the first image peak and a second magnitude of the second image peak.

12. The LIDAR system of claim 11, wherein to determine the target location using the first set of peaks and the second set of peaks the LIDAR system is further to:
select the first true peak from the first set of peaks and the second true peak from the second set of peaks; and
determine the target location based on the first true peak and the second true peak.

13. The LIDAR system of claim 10, wherein the one or more sets of frequency ranges are variable based on an ego-velocity of the LIDAR system.

14. The LIDAR system of claim 10, wherein to perform IQ processing the LIDAR system is further to:
generate first signal and a second signal based on the set of returned signals, wherein the first signal is shifted 90 degrees from the second signal;
generate a third signal, wherein the third signal comprises a combination of the first signal and an imaginary unit; and
combine the third and the second signal to generate a combined signal.

15. The LIDAR system of claim 14, wherein to perform IQ processing the LIDAR system is further to:
apply a fast Fourier transformer to the combined signal.

16. The LIDAR system of claim 14, wherein to combine the third signal and the second signal the LIDAR system is further to:
subtract the third signal from the second signal for an up-chirp and add the third signal to the second signal for a down-chirp; or
add the third signal to the second signal for an up-chirp and subtract the third signal from the second signal for a down-chirp.

17. The LIDAR system of claim 16, wherein subtracting the third signal from the second signal for an up-chirp and adding the third signal to the second signal for a down-chirp reduces a range of frequencies that is processed to determine one or more of the target location, the target velocity, and the target reflectivity.

18. The LIDAR system of claim 10, wherein the LIDAR system is further to:
provided the peaks associated with the target are not within the one or more sets of frequency ranges, refrain from using in-phase quadrature phase (IQ) circuitry.

19. A light detection and ranging (LIDAR) system, the system comprising:
a processor; and
a memory to store instructions that, when executed by the processor, cause the LIDAR system to:
transmit, toward a target in a field of view of the LIDAR system, one or more optical beams comprising at least one up-chirp frequency and at least one down-chirp frequency;
receive, from the target, a set of returned signals based on the one or more optical beams;
determine a plurality of frequency peaks associated with the target based on the set of returned signals;
determine whether the plurality of frequency peaks associated with the target are within one or more sets of frequency ranges comprising signal attribute values corresponding to a lower likelihood of accurately calculating a location or speed of the target;
provided the frequency peaks associated with the target are within the one or more sets of frequency ranges, perform in-phase quadrature phase (IQ) processing on the one or more received signals wherein the IQ processing reduces one or more magnitudes of one or more peaks of the plurality of frequency peaks associated with the target; and
determine one or more of the target location, a target velocity, and a target reflectivity using the plurality of frequency peaks associated with the target.

20. The LIDAR system of claim 19, wherein:
the peaks associated with the target comprise a first set of peaks and a second set of peaks;
the first set of peaks comprises a first true peak and a first image peak;
the second set of peaks comprises a second true peak and a second image peak; and
the IQ processing reduces a first magnitude of the first image peak and a second magnitude of the second image peak.

* * * * *